Aug. 28, 1923.                                              1,466,551
A. P. THURSTON
AIRCRAFT, SUBMARINE, TORPEDO, AND OTHER TOTALLY IMMERSED
CRAFT OR STRUCTURE
Filed Dec. 6, 1921            7 Sheets-Sheet 1
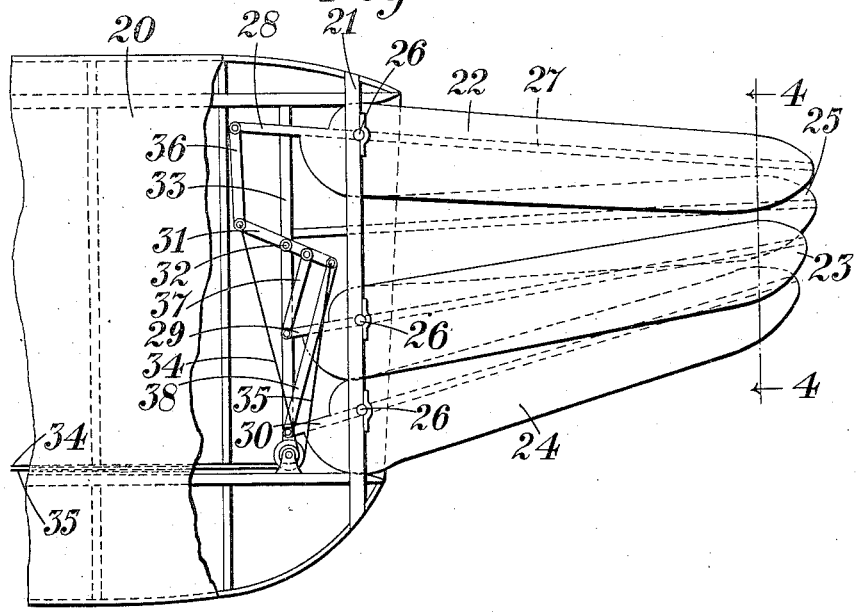
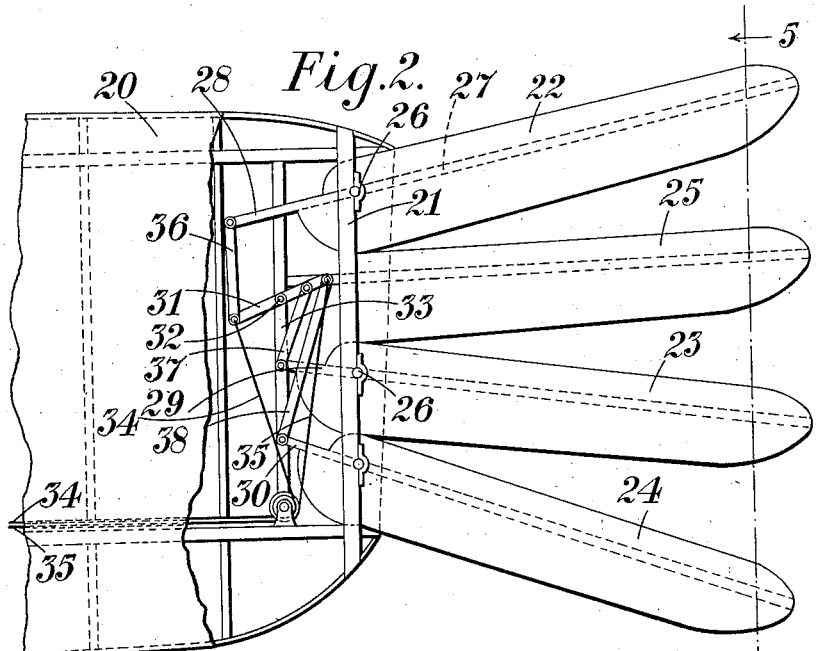
Inventor
Albert P. Thurston
by Wilkinson & Giusta
Attorneys.

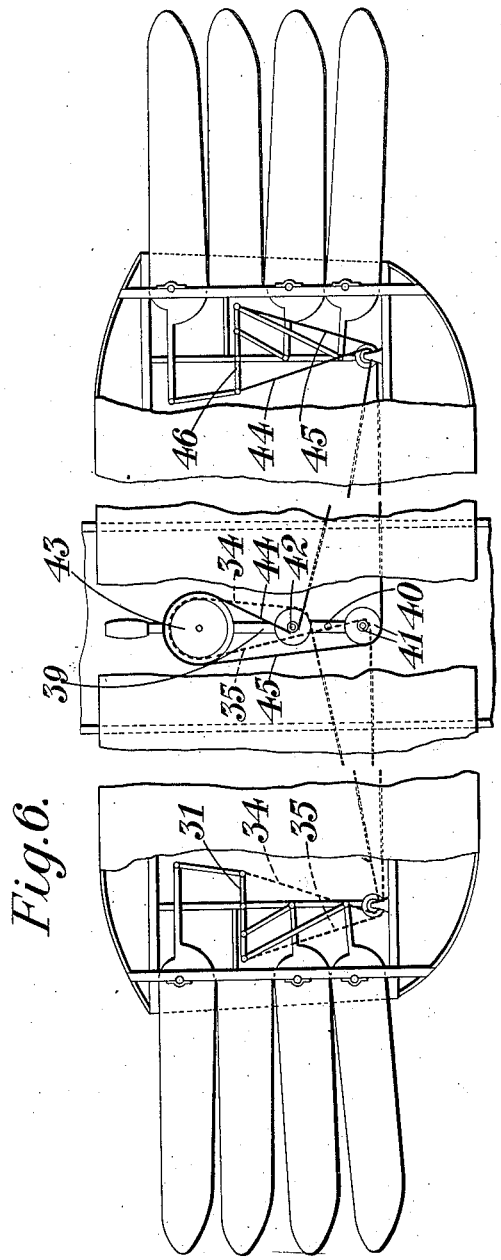
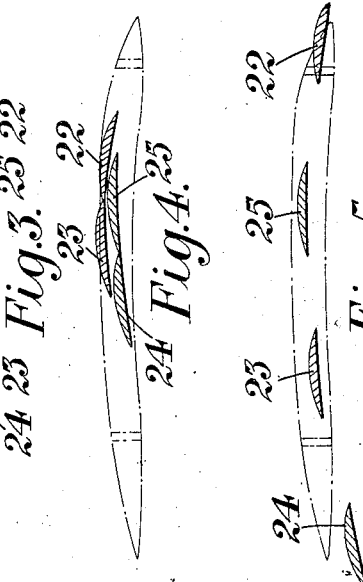
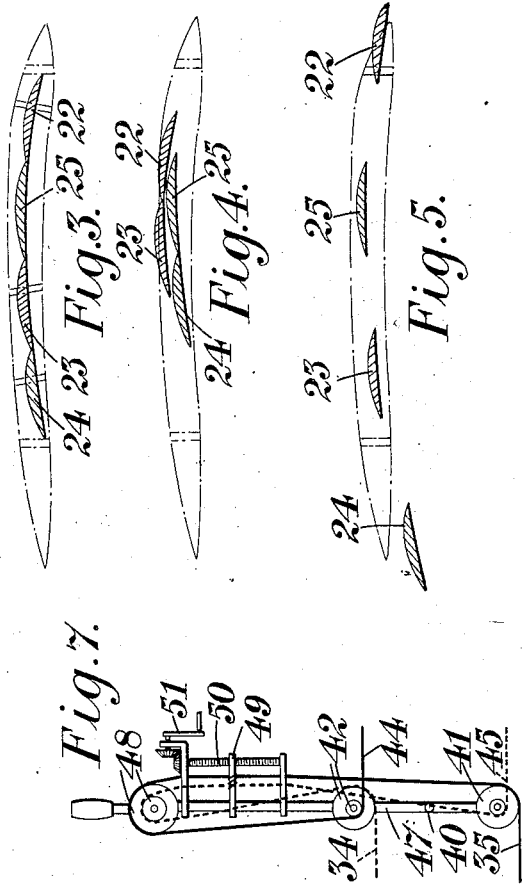
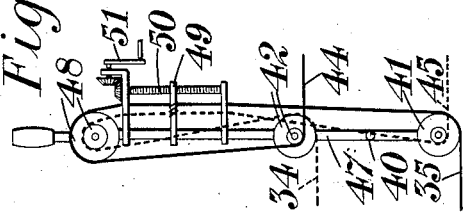

Aug. 28, 1923.
A. P. THURSTON
1,466,551
AIRCRAFT, SUBMARINE, TORPEDO, AND OTHER TOTALLY IMMERSED
CRAFT OR STRUCTURE
Filed Dec. 6, 1921
7 Sheets-Sheet 3
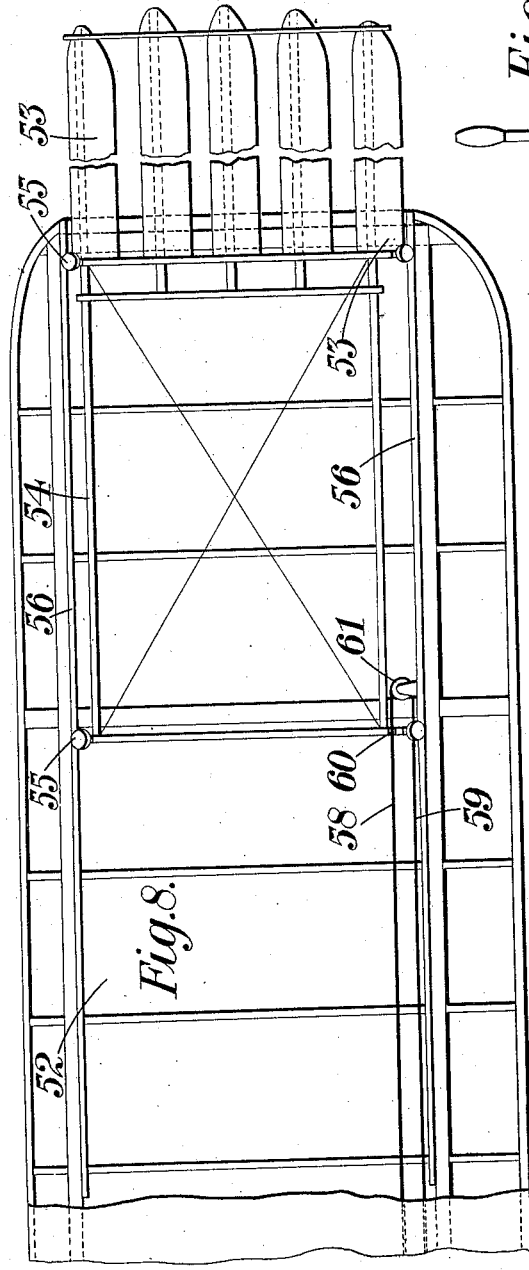
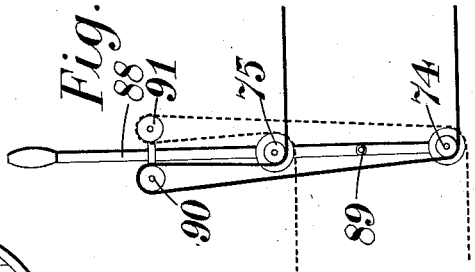
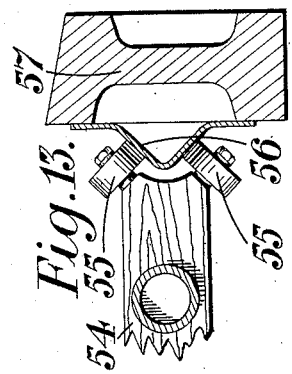
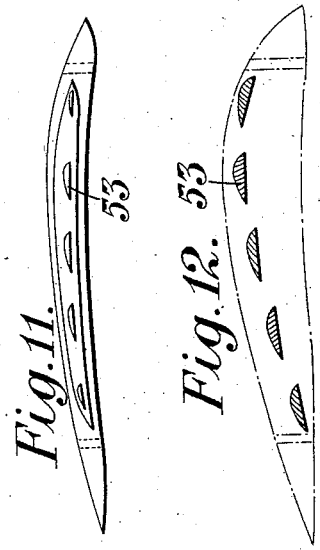
Inventor
Albert P. Thurston
by Wilkinson & Giusta
Attorneys.

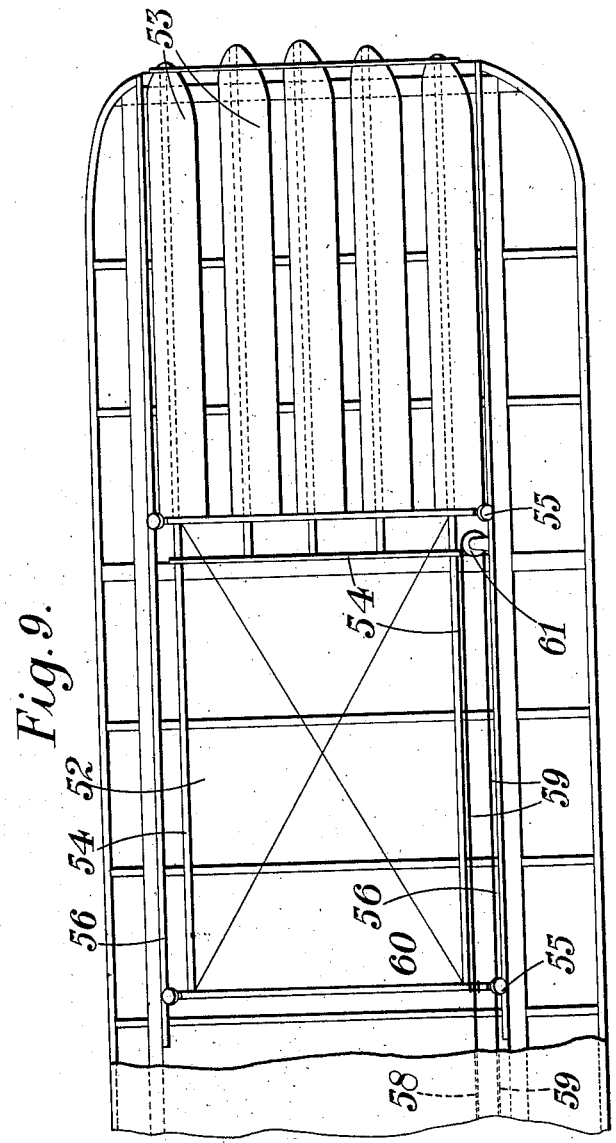

Aug. 28, 1923.
A. P. THURSTON
AIRCRAFT, SUBMARINE, TORPEDO, AND OTHER TOTALLY IMMERSED
CRAFT OR STRUCTURE
Filed Dec. 6, 1921

Inventor
Albert P. Thurston
by Wilkinson & Giusta
Attorneys.

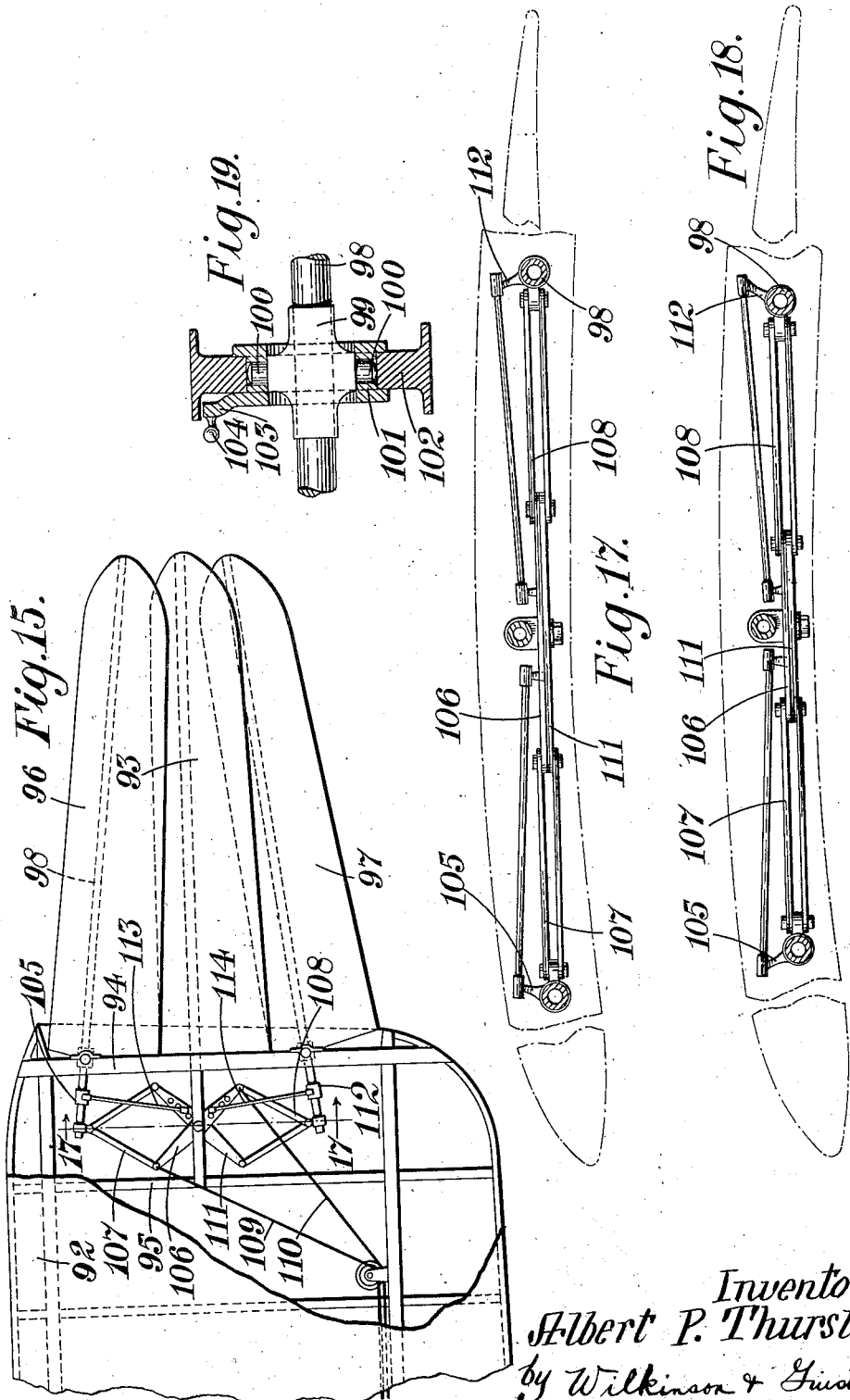

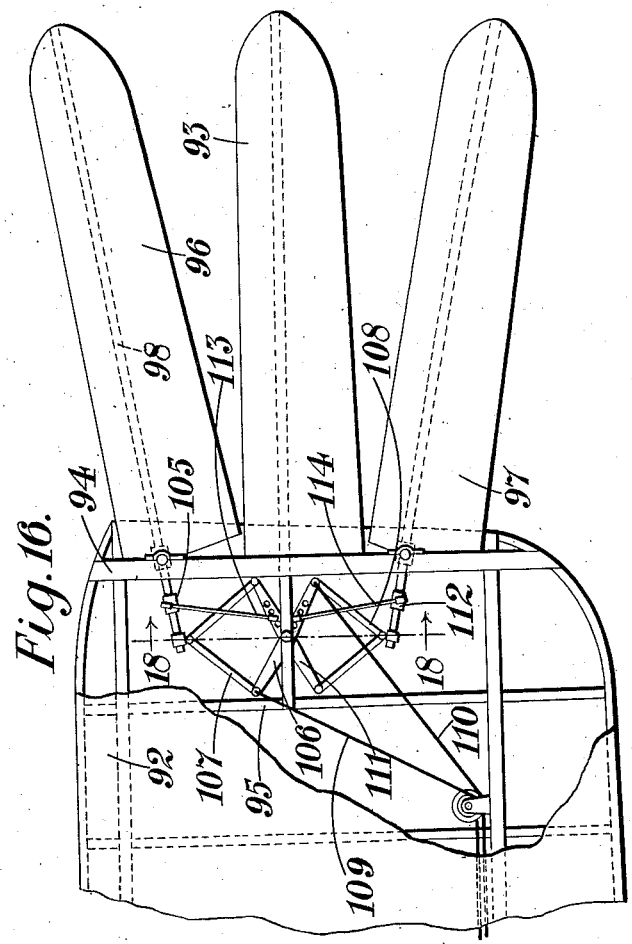

Patented Aug. 28, 1923.

1,466,551

UNITED STATES PATENT OFFICE.

ALBERT PETER THURSTON, OF LONDON, ENGLAND, ASSIGNOR OF TWO-THIRDS TO THE BRISTOL AEROPLANE COMPANY LIMITED, OF BRISTOL, ENGLAND, A BRITISH COMPANY.

AIRCRAFT, SUBMARINE, TORPEDO, AND OTHER TOTALLY IMMERSED CRAFT OR STRUCTURE.

Application filed December 6, 1921. Serial No. 520,387.

*To all whom it may concern:*

Be it known that I, ALBERT PETER THURSTON, a subject of the King of England, residing at London, England, have invented certain new and useful Improvements in Aircraft, Submarines, Torpedoes, and Other Totally Immersed Craft or Structures, of which the following is a specification.

This invention is for improvements in or relating to supporting wings for air-craft or other totally immersed structures, and has for its object to provide a supporting wing which shall be more effective, and more efficient, that is to say shall have a higher effective lift, than the supporting wings or planes hitherto known.

According to this invention there is provided in a supporting wing for aircraft and other totally immersed structures, the combination with a main plane, of a substantially co-planar extension of aerofoil shape that is constant in form, extends from the wing substantially in the direction of the longitudinal axis thereof, and is so constructed and arranged that it is adjustable to provide at the end of the main plane a portion having a greater lift per unit area than the main plane. The said extension may be designed to have a higher lift coefficient, or it may be set at a greater angle of incidence than the main plane, or it may be arranged to be extended and contracted to vary the subtended area and therefore the total lift. The provision of such an adjustable extension enables the pilot to provide at will, and invariably, an intensified suction and compression effect above and below respectively the end margin of the main plane. In addition to obtaining the direct lift of the extension, the provision of such a bank of suction and compression improves the efficiency of the main plane itself.

The extension aforesaid may be constituted according to one feature of this invention by a plurality of rigid pinions so disposed that the leading edges of successive pinions are at successively increasing distances from the front pinion of the plurality, and the elements of said plurality may be adjustable either relatively to one another or as a group or groups relatively to the main plane.

The spacing apart of the pinions, or their overlapping, in the direction of the line of flight, will be selected according to the requirements of any particular case. Similarly also the selection of the angle of incidence of the extension, or of the group of pinions as a group, will be selected according as a high-speed or a high-lift wing is required.

According to another feature of this invention there may be provided in a machine having wings as above set forth, the combination with an adjustable extension on each wing, and means for adjusting them at will similarly and simultaneously, of operative connections from these extensions to the pilot's control-lever, whereby the usual lateral movement of the lever operates the said extensions oppositely to provide for lateral control of the machine.

Where a plurality of pinions is used as the adjustable extension, one of the pinions may be arranged as a fixed extension of the main plane, in which case the others are adjustable relatively to it. The adjusting movements may be either longitudinally or laterally of the pinions themselves, thus for example the pinions can be collapsed longitudinally into the interior of the main plane, when it is desired to render them inoperative. Alternatively, the pinions may be pivotally mounted on the main plane so as to be capable of being swung in a direction laterally of their own length.

Other features of this invention relate to further details of construction, such as particular arrangements of the pinions, their mounting, the balancing of the forces acting upon a pinion or pinions against the forces acting on another pinion or pinions, and also the controlling mechanism whereby the pilot can effect the desired adjustments.

In the accompanying drawings which illustrate diagrammatically various embodiments of the present invention—

Figure 1 is a plan showing the end of a wing whereof the adjustable extension is constituted by a plurality of pivotally mounted pinions, this figure showing the pinions closed together;

Figure 2 is a view similar to Figure 1 but showing the pinions expanded away from one another;

Figure 3 is a sectional view approximately on the line of the pivots of the pinions showing their relative spacing;

Figure 4 is a sectional view on the line 4—4 of Figure 1;

Figure 5 is a similar sectional view on the line 5—5 of Figure 2;

Figure 6 is a diagrammatic view showing the controlling mechanism for two sets of pinions as illustrated in Figures 1 and 2 whereby similar and simultaneous, or differential adjustment can be effected;

Figure 7 shows an alternative arrangement of the controlling mechanism on the pilot's control-lever;

Figure 8 is a plan of an end portion of a wing whereof the adjustable extension is constituted by a plurality of parallel pinions which are arranged to slide within the main plane or to be projected therefrom, this figure showing the pinions projected;

Figure 9 is a view similar to Figure 8 but showing the pinions retracted, the fabric of the main plane being omitted to show the pinions;

Figure 10 shows diagrammatically in elevation a machine having two main planes with adjustable pinions as illustrated in Figures 8 and 9 and the mechanism for controlling them;

Figure 11 is a diagrammatic view showing one particular arrangement and relative spacing of the pinions suitable for a high efficiency high-speed wing;

Figure 12 is a similar view showing another disposition of pinions suitable for a high-lift wing;

Figure 13 shows a detail of construction;

Figure 14 shows an alternative arrangement on the pilot control-lever;

Figure 15 shows a third construction in which pinions are pivotally mounted on the end of the main wing, this figure showing the pinions closed together;

Figure 16 is a similar view showing the pinions expanded;

Figure 17 is a sectional view on the line 17—17 of Figure 15;

Figure 18 is a similar view being a section on the line 18—18 of Figure 16;

Figure 19 shows a detail of construction.

Referring first to Figures 1 and 2, the main plane which may be of any desired construction or aerofoil section is indicated generally by the reference 20. Upon one of the frame members 21 at or near the end of the plane 20 there are pivotally mounted a plurality of rigid pinions 22, 23, 24. There is also provided a pinion 25 which is rigidly fixed to the member 21, this pinion extending substantially parallel with the longitudinal axis of the plane 20. The pivot pins of the various pinions, indicated at 26 are slightly inclined to one another, diverging from a point below the surface of the main plane 20. Each of the pinions 22, 23 and 24 has a main spar as shown at 27 for the pinion 22 extending throughout the length of the pinion, and this spar is extended rearwardly beyond the pivot 26, the respective extensions for the three pinions being indicated at 28, 29, 30.

A centrally pivoted lever 31 is mounted at 32 on a suitable frame-member 33 of the main plane, and is controlled by cables 34, 35 connected to its ends. This lever is connected by a link 36 to the extension 28 for the pinion 22, and by similar links 37, 38 to the extensions for the pinions 23, 24 so that when the lever 31 is rocked on its axis 32 by the controlling cables 34, 35, it imparts a rocking movement to the pinions 22, 23, 24 about their respective pivotal axes. The points of connection of the links 36, 37, 38 to the lever 31 are selected with reference to the lengths of the extension arms 28, 29, 30 so as to impart the desired angular movement to the pinions to expand them to the position indicated in Figure 2.

The pinions may be of any desired aerofoil section, but it will generally be preferred that they are of a high-lift section. The inner or pivotal ends of the pinions are shaped as shown in Figures 1 and 2 so as to be circular about the axis of pivoting as a centre. With this arrangement the various pinions lie closely in contact with one another at their roots as shown in Figure 3 whether they are contracted as in Figure 1 or expanded as in Figure 2. Owing to the above mentioned inclination of the pivotal axes 26 of the different pinions towards one another, the angle of incidence of the pinions varies slightly as they are opened and closed, and this enables them to nest together or overlap when they are contracted, as in Figure 1, as shown by the sectional view in Figure 4. It will be seen that the movable pinions 22, 23, 24 collapse closely on to the fixed pinion 25. When the pinions are expanded, their outer ends occupy the position shown in Figure 5, so that a substantial gap in plan is provided between the pinions enabling each to operate efficiently as an individual aerofoil.

By suitably selecting the inclination of the pivots for the pinions the result can be obtained that when the pinions are closed together the chord of the pinions, that is to say the line joining the front edge of the front pinion to the rear edge of the rear pinion is substantially parallel with the chord of the main plane, whereas when the pinions are spaced apart, this chord has a greater angle of incidence than the main plane. This gives a wing which is an efficient high-speed wing with the pinions closed and an efficient high-lift wing with the pinions expanded.

Referring now to Figure 6 which illustrates diagrammatically a controlling mechanism for these pinions, a pilot's control-lever is indicated at 39 and it is pivoted to swing laterally about a horizontal axis 40. Pairs of guide pulleys 41, 42 are mounted on the lever 39 on opposite sides of its pivotal axis 40 and equidistant therefrom. Near the upper end of the lever there is mounted a drum or the like 43 which is provided with any suitable ratchet mechaism or the equivalent which will restrain its movement, but will permit its rotation when desired by the pilot. The two control cables 34, 35, (see also Figure 1) are led as shown in Figure 6 each over one of the guide pulleys 41 and 42 and thence on to the drum 43. If desired the two cables may be made in one and simply extend around the drum 43 or they may be separately wound on to it in opposite directions. The corresponding controlling cables 44, 45 for the pinions on the other wing of the machine are arranged exactly similarly to the cables 34, 35, and are also connected to the drum 43.

With this arrangement the pilot can effect simultaneous and similar control of the pinions at each side of the machine, or he can adjust them oppositely when required to give lateral control of the machine. Similar adjustment of the two sets of pinions is effected by rotating the drum 43 in one or other direction. For example, if it is rotated anti-clockwise it will be seen that the control cable 34 is wound in and simultaneously the control cable 35 is paid out by an equal amount. These two cables control the lever 31 and effect the adjustment of the left-hand set of pinions; this anti-clockwise motion of the drum expands the pinions. Simultaneously with this adjustment of the left-hand pinions, the rotation of the drum winds in the cable 44 and pays out the cable 45 so that a similar adjustment is effected on the right-hand set of pinions. The other, differential, control of the pinions is effected by rocking the control lever about its pivot 40. Assuming that the upper end of the lever is rocked towards the right in Figure 6, the guide pulleys 42 are carried towards the right and the guide pulleys 41 towards the left. This movement of the guide pulleys which are located in bights in the various cables draws upon the cable 34 and releases the cable 35 thereby rocking the lever 31 and expanding the left-hand set of pinions. At the same time the movement of the guide pulleys draws the cable 45 but releases the cable 44, thereby rocking the lever 46 for the right-hand set of pinions, in such a manner as to contract them. A differential or opposite adjustment of the pinions on each side of the machine is thereby obtained. By thus varying the lift of the wings on either side of the machine at will, the pilot can effect lateral control of the machine.

Figure 7 illustrates a modified construction of controlling gear as mounted on the pilot's control-lever. The lever is indicated at 47, being pivoted about a horizontal axis 40 in the same way as in Figure 6. The control cables in this figure are given the same references as in Figure 6, as are also the guide pulleys 41, 42 which are situated on opposite sides of the pivotal axis 40 of the control lever. Instead of winding the cables upon a drum, the cables 34 and 44 are led up over guide pulleys 48 near the upper end of the control lever and are led down therefrom and secured to an abutment or anchorage 49. The cables 35 and 45 are directly secured to this abutment. Provision is made for moving this abutment longitudinally of the control lever 47, as for example by mounting it upon a screw-threaded spindle 50 rotatable through suitable gearing by a handle 51 operable by the pilot. The operation of this mechanism is exactly the same as that illustrated in Figure 6, since rotation of the handle 51 by moving the abutment 49 upwards or downwards draws upon and releases the control cables in the manner necessary to effect simultaneous adjustment of both sets of pinions. The lateral swinging movements of the control-lever operate through the guide pulleys 41, 42 in exactly the same manner as described with reference to Figure 6.

Referring now to the construction illustrated in Figures 8 and 9, there is here illustrated diagrammatically a main plane 52, of which the adjustable extension is constituted by a group of pinions which are moved longitudinally of the main plane so as to lie entirely within it or to be projected from the end thereof to any desired extent. The pinions indicated by the reference 53 are each rigid in themselves and rigidly secured to a carriage or framework 54 provided with rollers or wheels 55 running on guides 56 extending longitudinally of the main plane 52 and inside it. In Figure 13 a suitable arrangement of these rollers is shown. The carriage 54 carries at each corner the pair of rollers 55 which are inclined to one another so as to engage oppositely directed faces of the guide 56 and thereby adequately retain the carriage on the guides however the machine may be tilted. The guides 56 are conveniently secured to longitudinal members 57 of the main plane.

The carriage 54 is controlled by means of a pair of cables 58, 59 which are anchored to it at 60 and led away from the anchorage in opposite directions. The cable 59 passes round a guide pulley 61 mounted on one of the spars of the main plane and passes thence to the controlling mechanism together with the cable 58.

A set of pinions similar to that illustrated in Figures 8 and 9 is provided at the end of each of the main planes, and they are adjusted by the pilot either similarly or differentially as may be desired. One form of controlling mechanism is illustrated diagrammatically in Figure 10 as applied to a bi-plane machine. The main planes are indicated respectively at 52, 62, 63, 64 with the carriages at 54, 65, 66, 67 respectively and the groups of pinions shown partially projected at 53, 68, 69, 70 respectively.

The pilot's control-lever indicated at 71 is pivoted about a horizontal axis 72. It carries guide pulleys 73 mounted concentrically with the axis of pivoting, and two other sets of guide pulleys 74, 75 spaced equally away from its pivotal axis 72. There is also provided a drum 76 mounted in any conveniently accessible position in the fuselage and this drum has a ratchet and pawl or other quickly releasable locking device and is rotatable at the will of the pilot.

Taking first the control cables for the pinions 53, which are shown at 58, 59 (see also Figures 8 and 9). The cable 58 passes from its anchorage 60 on the carriage around one of the lower guide pulleys 74, and around one of the central guide pulleys 73 and thence to the drum 76 whereto it is secured. Similarly the cable 59 passes from its anchorage 60 around the guide pulley 61 and thence around one of the guide pulleys 75 on the pilot's control-lever, thence around one of the central pulleys 73 to the drum 76 whereto it also is affixed. Instead of securing each of the cables 58, 59 individually to the drum 76 they may be secured together and fixed to the drum so that rotation of the drum winds in one of them while it pays out the other.

The pinions 70 on the companion main plane 64 are controlled by cables 77, 78 anchored to the carriage 67 at 79. The cable 77 extends from its anchorage 79 around one of the lower guide pulleys 74 on the pilot's control-lever, and then is secured to the cable 58 as shown at 80. The cable 78 extends from its anchorage 69 around a guide pulley 81 similar to the guide pulley 61 and thence around one of the upper guide pulleys 75, after which it is secured to the cable 59. The differential or similar adjustment of the two sets of pinions 53, 70 is effected by rocking the control-lever 71 about its axis 72 and by rotation of the drum 76 in the manner hereinbefore described with reference to Figure 6 so that it need not be repeated.

The adjustments of the two groups of pinions 68, 69 on the upper main planes are effected simultaneously with those on the lower main planes, by means of cables coupling the carriage in each lower plane to the carriage of the plane above it. Thus the carriage 66 is coupled to the carriage 54 by a pair of cables 82, 83 respectively. These are anchored to the carriage 66 at 84, and the cable 83 is led away from its anchorage around suitable guide pulleys and its end is joined to the cable 59, at 85. The cable 82 is led round a guide pulley 86 (corresponding to the guide pulley 61) and thence round other suitable guide pulleys and is coupled at 87 to the cable 58. The two anchorages 60, 84 are thus coupled by a closed circuit comprising cable 82, part of cable 58, part of cable 59, and cable 83, so that movement of the anchorage 60 causes a similar and simultaneous movement of the anchorage 80. Therefore the pinions 69 are moved similarly and simultaneously with the pinions 53. A similar arrangement is used to couple the pinions 70 or 68 together so that they move in unison.

Figure 14 illustrates a slightly modified arrangement of the controlling mechanism. The pilot's control lever indicated at 88 is pivoted to swing about a horizontal axis 89. It carries upper and lower sets of guide pulleys 74, 75 equidistant from the axis 89, and the control cables are led around these in the manner hereinbefore described. The ends of the cables, which are joined together, are passed around drums 90, 91, which are mounted in any convenient manner so that they can be rotated individually or simultaneously at the will of the pilot. The cables may merely pass around the drums 90, 91 being controlled in such a way as to prevent the cables slipping on them, for example by placing a length of chain in the cable and forming teeth on the drums 90, 91.

In all the hereinbefore described arrangements for controlling the pinions, springs or other yielding or resilient devices may be placed in the cables to enable the lateral controlling adjustments to be effected when both sets of pinions are fully retracted or closed together, the control then being effected by projecting or expanding one set of pinions without altering the other.

The aerofoil section of the pinions themselves and their relative positions may be varied according to the particular result which it is desired to obtain. Thus, for example, the arrangement shown in Figure 11 in which the chord of the curve on which the pinions lie is parallel with the chord of the main plane, is suitable for a high speed wing, whereas the arrangement shown in Figure 12, in which the chord of the group of pinions has a greater incidence than that of the main plane, is particularly suitable for a high lift wing. Furthermore, the pinions may be so disposed that the rear edge and top side of a front pinion are lower than the front edge and bottom side of a succeeding pinion where it is desired to provide a high-speed wing at a small angle of incidence of the main plane, and alternatively the disposition may be such that the rear edge and bottom side of a front pinion are higher than the front edge and top side of a succeeding pinion to provide a high-lift wing at a large angle of incidence of the main plane. It will usually be preferable to space the pinions apart so that in plan there is a gap between the trailing edge of one pinion and the front edge of the next succeeding pinion, but this arrangement is not essential since the pinions may be caused to overlap one another if so desired. These various arrangements of the pinions may be applied to any of the constructions or arrangements of groups herein described.

Turning now to Figures 15–19, these illustrate an alternative arrangement and construction of a group of pivoted pinions on the end of a main plane.

In Figures 15 and 16 the end portion of a main plane is indicated diagrammatically at 92. A pinion 93 which is rigid in itself is rigidly secured to frame members or ribs 94, 95 of the main plane, and this fixed pinion constitutes the central pinion of the group. As illustrated, the group comprises three pinions whereof the two movable ones are indicated at 96, 97 respectively.

The pinions 96, 97 are each mounted in the manner illustrated in Figure 9. The main spar of the pinion indicated at 98 is rigidly secured in a tubular member 99 provided with trunnions 100 which are located in bearings in a disc-like member 101, so that the pinion is capable of rotation about the axis of these trunnions. The disc-like member 101 is itself mounted in a housing or bearing 102, which conveniently is secured to the frame-member 94 of the main wing so as to be rotatable about the longitudinal axis of the frame-member 98. In Figure 16 there is shown a projecting portion 103 carrying a ball-ended arm 104 whereto connection may be made for effecting such rotation of the member 101 and the pinion with it. In Figure 15 and 16 this rotation is effected by an arm 105 which is secured on the frame member 98 at any convenient position. Conveniently, the member 98 is tubular in formation and constitutes the rigid main spar of the pinion, and the two pinions 96, 97 are mounted in exactly the same way.

The mechanism for adjusting the pinions, as shown in two different positions in Figures 15 and 16, comprises a linkage which is of a lattice-work or lazy-tongs arrangement. A lever 106 centrally pivoted on one of the frame-members of the main plane 92 is connected at its ends by links 107, 108 respectively to the inner ends of the main spars of the pinions 96, 97. It is also connected at its ends to two controlling cables 109, 110 which are connected to the pilot's controlling mechanism for the pinions, this being similar to the various constructions hereinbefore described, or of any other desired type. A second lever 111 is pivoted coaxially with the lever 106 and has its ends similarly connected to the spars of the two movable pinions, thereby providing a more or less symmetrical operating linkage. Each of the main spars of the movable pinions carries an upstanding arm 105, 112 respectively (see also Figures 17 and 18) and these arms are connected by links 113, 114 respectively to points on the levers 111, 106 near the pivotal axis thereof. Conveniently a series of holes is provided in each of these last-mentioned levers so that the point of connection of the links 113, 114 can be varied if desired. The exact arrangement of each of these links is determined according to the particular controlling movements that are desired, the effect being determined by the distance of the arm 105 from the trunnion axis of the pinion 96, the length of the arm 105, and the radial distance of the point of connection of the other end of the link 113 from the pivotal axis of the levers 106 and 111. When the lever 106 is swung to expand the pinions into the position shown in Figure 16, the difference of translational movement of the end of the link 113 which is connected to the lever 111, and the end of the arm 105 which is secured on the frame-member 98 of the pinion, causes the arm 105 to be rocked so as to tilt the pinion and change its angle of incidence. The effect is shown most clearly in Figures 17 and 18. By suitably selecting the various factors above mentioned, this tilting movement which is given to the pinion may be arranged to provide for various effects. Amongst these may be mentioned the variations of the angle of incidence of the pinions according to whether they are closed or expanded: facilitating the closing together of the pinions by allowing them freely to overlap one another; and balancing to any desired extent the forces acting upon the different pinions so as to render them more easily adjustable or for any other purpose.

The balancing of the pinions may take into consideration any of the forces acting upon the pinions, particularly those forces which are not productive of a useful result. With the mechanism illustrated, the drag upon a front pinion 96 balances the drag upon the rear pinion 97, since one tends to move the linkage in the opening or expanding direction and the other tends to move it in the closing direction. Similarly, the tendency of a pinion to turn about its main spar, and thereby change its angle of incidence, operates upon the linkage through the arms 105, 112. This turning tendency with the mechanism illustrated, can be used to balance to a greater or less extent the drag upon the pinion or the forces acting upon another pinion.

Any desired arrangement may be used for balancing the pinions, thus for example where there is one fixed pinion in a group, those in front of it may be interconnected as a group and those behind it may be interconnected as another group. The groups may be balanced in themselves, or they may be balanced against one another.

When a group of pinions is used the lengths of the pinions may be varied in any desired manner, as may also be the number. Thus, for example, it is sometimes desirable that the pinions should be successively each of greater length than the pinion in front of it. In other instances, where for example one fixed pinion is used, the number of pinions behind the fixed pinion may be greater than the number in front, and each pinion may be successively of less length than the one in front of it. Generally speaking, the arrangement of the pinions may follow the arrangements which are found in birds, an efficient disposition being that of the vulture and stork.

It has been found by experience that the pinions should have an aspect ratio of between 4 and 12, and that the gap between them, when such is provided, should be about one-half of the length of the chord of a pinion. When the pinions are of the type which close together it is desirable that they should when closed have an aerofoil section that is suitable for a high speed. When the pinions are of the type which collapse longitudinally into the interior of the main plane, there may be provided a fairing on the outer end of the pinions which conforms to the shape and section of the end of a main plane, so that when the pinions are retracted the correct formation of the main plane is maintained. It will also be appreciated that in all cases the opening in the end of the main plane when the pinions are projected should be covered with some suitable flexible material which will give them the desired streamline shape.

Any desired construction of the pinions themselves may be used, thus for example the spars of the various pinions may be of cantilever design, or they may be braced from vertical posts at the pivot points when the pivoted construction of pinions is used. In the case of biplanes, corresponding pinions may be braced together by struts and lift and anti-lift wires.

It also lies within the scope of this invention to provide if desired, for varying the angle of incidence of the pinions, in which case a construction analogous to that illustrated in Figure 19 would be used. In this case the arm 104 would be connected by suitable means to a controlling lever operated by the pilot.

When the wings of a machine are provided with a gap in them, such for example as a gap above the pilot, in the upper wings of a biplane or a gap between the bottom wings and the body of a machine, or any other gaps, pinions in accordance with this invention may be mounted in these gaps, these pinions operating as above described to provide a bank of suction and compression at the end or edge of the main plane and thereby improve the efficiency of the plane.

By way of example, it may be stated that a satisfactory wing is obtained, with a construction similar to that shown in Figures 8 and 9 when the adjacent pinions are inclined to one another at an angle not exceeding 10 degrees. In a set of five pinions the angle between each pinion and the next one behind it were respectively 7.5 degrees, 5 degrees, 2.5 degrees and 0. degrees. It will be understood, however, that the invention is not limited to any such specific arrangement.

All the arrangements and mechanisms hereinbefore described as applied to an aeroplane may be used on a reduced scale for submarines, torpedoes, hydroplanes and any other vessels that are totally submerged in the medium in which they operate.

What I claim as my invention and desire to secure by Letters Patent is:—

1. An aeroplane wing comprising a main plane, an aerofoil group having individual rigid pinions of a higher lift per unit area than the main plane and arranged at the end of the main plane, and means for adjusting said group into and out of operative positions to produce at will the required degree of bank of suction and compression at the end of the main plane, substantially as described.

2. An aeroplane wing comprising a main plane, an aerofoil group having individual pinions arranged at the end of the main plane, said aerofoil group being arranged with its chord substantially parallel with the chord of the main plane to provide a wing of high speed section at small angles of incidence of the main plane and equivalent to a high lift wing at larger angles of incidence of the main plane, and means for extending and retracting said aerofoil group relatively to the main plane to produce the required degree of bank of suction and compression at the end of the main plane, substantially as described.

3. An aeroplane wing comprising a main plane, an aerofoil including a plurality of pinions and a carriage supporting said pinions, guide rails longitudinally on the main plane, wheels on the carriage engaging the rails for supporting and guiding the carriage, an endless cable connected to the carriage, a pivoted control lever, guide pulleys mounted on the lever equidistantly from opposite sides of the axis of the lever and respectively engaging the opposite runs of the cable, and means engaging the cable for effecting the opposite movements thereof upon swinging the lever to project and retract the carriage relatively to the end of the main plane.

In testimony whereof I affix my signature.

ALBERT PETER THURSTON.